United States Patent
Howell et al.

(10) Patent No.: US 9,010,832 B2
(45) Date of Patent: Apr. 21, 2015

(54) MULTI-PIECE VEHICLE TANK ENCLOSURE

(71) Applicant: Westport Power Inc., Vancouver (CA)

(72) Inventors: John F. Howell, Northville, MI (US); Paul G. Guaresimo, Grosse Pointe Woods, MI (US); William G. Szuch, Goodison, MI (US)

(73) Assignee: Westport Power Inc., Vancouver, BC (CA)

(*) Notice: Subject to any disclaimer, the term of this patent is extended or adjusted under 35 U.S.C. 154(b) by 0 days.

(21) Appl. No.: 13/897,021

(22) Filed: May 17, 2013

(65) Prior Publication Data

US 2013/0306644 A1  Nov. 21, 2013

Related U.S. Application Data

(60) Provisional application No. 61/649,229, filed on May 18, 2012.

(51) Int. Cl.
*B60N 3/12* (2006.01)
*B60K 15/073* (2006.01)
*B60K 15/07* (2006.01)
*B60R 11/06* (2006.01)

(52) U.S. Cl.
CPC .............. *B60K 15/073* (2013.01); *B60K 15/07* (2013.01); *B60Y 2200/141* (2013.01); *B60R 11/06* (2013.01)

(58) Field of Classification Search
CPC .................................. B60R 9/00; B60R 11/06
USPC .......... 296/37.6; 220/562; 224/539, 543, 567; 29/428
See application file for complete search history.

(56) References Cited

U.S. PATENT DOCUMENTS

| | | | |
|---|---|---|---|
| 1,349,859 A | 8/1920 | Smith | |
| 3,854,621 A * | 12/1974 | Parry | ............................. 220/554 |
| 4,967,944 A | 11/1990 | Waters | |
| 5,169,200 A * | 12/1992 | Pugh | ............................ 296/37.6 |
| 5,316,358 A | 5/1994 | Payne et al. | |
| 5,893,599 A * | 4/1999 | Strohfeldt | .................... 296/37.6 |
| 6,039,203 A | 3/2000 | McDaniel | |
| 6,502,868 B1 | 1/2003 | Laspa et al. | |
| 7,128,356 B2 | 10/2006 | Bassett | |
| 2004/0020952 A1 | 2/2004 | Schomaker | |
| 2005/0104415 A1 | 5/2005 | Hungerford et al. | |

OTHER PUBLICATIONS

Notice of Allowability and accompanying List of References Cited issued on Jul. 14, 2014, in connection with related U.S. Appl. No. 29/445,553.

* cited by examiner

*Primary Examiner* — Joseph D Pape
(74) *Attorney, Agent, or Firm* — Corridor Law Group, P.C.

(57) ABSTRACT

A multi-piece tank enclosure comprises a horizontal cover and a vertical panel removably connected to each other and to the vehicle body such that they form a space for enclosing a tank that is mounted on the vehicle body. The horizontal cover can comprise an assembly formed by a lid and a toolbox bin, and the vertical panel can be provided with an opening for accessing the tank fittings. The multi-piece tank enclosure can be installed on a vehicle by removably attaching the horizontal cover and the vertical panel to the vehicle body. The multi-piece tank enclosure can accommodate toolbox bins of different sizes, each matched to a different sized tank.

24 Claims, 6 Drawing Sheets

MULTI-PIECE VEHICLE TANK ENCLOSURE

CROSS-REFERENCE TO RELATED APPLICATION

This application is a related to and claims priority benefits from U.S. Provisional Patent Application Ser. No. 61/649,229, filed on May 18, 2012, entitled "Multi-Piece Vehicle Tank Enclosure". The '229 provisional application is hereby incorporated by reference herein in its entirety.

FIELD OF THE INVENTION

The present invention relates to a multi-piece vehicle tank enclosure for a vehicle, more specifically to a tank enclosure that can be easily installed to protect a tank mounted on the vehicle body and tank's associated fittings.

BACKGROUND OF THE INVENTION

Presently, most over-the-road vehicles are fuelled by gasoline or diesel fuel. There are certain shortcomings to using such fuels. They are increasingly expensive and they have an adverse impact on the environment because combustion products exhausted into the atmosphere are environmentally undesirable.

It is known that internal combustion engines can operate efficiently with reduced levels of pollutants in the engine exhaust if fuelled with natural gas or other combustible gaseous fuels, such as methane, propane, butane, hydrogen, and blends of such fuels. For vehicles fuelled with both gasoline and natural gas, for example, auxiliary fuel tanks filled with compressed natural gas (CNG) can be placed in the trunk or other storage areas of the vehicle and can be connected with the vehicle's fuel system for supplying fuel to the engine. Storing fuel in auxiliary fuel tanks on board a vehicle is limited by the available storage areas and in turn, the available fuel storage volume affects the distance that the vehicle can travel.

For pick-up trucks, auxiliary CNG tanks can be installed for example in the truck's bed. When installed in the truck bed, the auxiliary tank and its fittings are exposed to the surrounding environment and can be damaged by accidental impact caused by other objects carried in the truck bed or can be affected by exposure to adverse weather conditions. Also, when a CNG tank is installed in the truck bed this takes away space that can be used for carrying other objects, for example in a toolbox.

U.S. Pat. No. 6,039,203 describes a combination fuel tank/tool container for a vehicle comprising a container with a first compartment for holding a pressurized fuel and a second compartment for holding tools. In another embodiment described in the above patent the fuel tank/tool box combination comprises a fuel tank mounted on a mounting surface and a tool compartment supported by a wall provided with an opening for accessing the fuel tank gage and inlet. Alternatively, the tool compartment can be supported by both the wall and the fuel tank or just by the fuel tank itself.

An integrated fuel tank/tool box like the one described in U.S. Pat. No. 6,039,203 has the disadvantage that it is delivered to the customer as a unit which does not facilitate replacing parts that get damaged. The alternate embodiment described in the '203 patent, which comprises a tool compartment supported by the fuel tank or by a wall installed on the vehicle body, as illustrated, does not seem to provide a safe solution for installing a toolbox and a fuel tank on board of a vehicle since tool compartment is shown as being supported just by a vertical wall which would not provide enough stability.

With a unitary design the previously known solutions are not easily adaptable to different fuel tank specifications. A truck manufacturer may want to have the option of offering different sized CNG fuel tanks depending on the range requirements.

Accordingly, there is a need for an improved arrangement for protecting a fuel tank on a vehicle body while allowing some room for storage of other objects or loads that are carried by the vehicle. Preferably, the arrangement should be easy to install, while accommodating tanks of different dimensions and allowing the replacement of only the damaged parts without replacing the whole assembly.

SUMMARY OF THE INVENTION

A multi-piece tank enclosure protects both a tank and associated fittings installed on board of a vehicle. The fittings can include, for example, the tank valves, pressure regulators, pressure relief valves, sensors, other instrumentation and associated piping. The multi-piece tank enclosure comprises a horizontal cover and a vertical panel, which are removably joined to one another when mounted on the vehicle's body and form together with the vehicle's body a protected space for enclosing the fuel tank and its fittings. In this context, the body of a pick-up truck vehicle for example includes the floor, bed sides and the front panel of the pick-up truck bed, a tank being typically mounted near the front panel, behind the cab.

The horizontal cover and the vertical panel are each removably mounted to the vehicle body. The upper edge of the vertical panel is removably mounted to the horizontal cover and the lower edge of the vertical panel is removably mounted to the vehicle body.

The horizontal cover and the vertical panel can each be removably mounted to the body of a pick-up truck and they are removably joined together to form a space that encloses a tank.

The fuel tank is preferably secured to at least two supporting brackets which are mounted on the pick-up truck bed and can be secured to the frame of the truck. The tank can be secured to the tank supporting brackets by at least two straps which encircle the tank and which are each provided with mounts for mounting the strap to one of the supporting brackets.

In a preferred embodiment, the lower edge of the vertical panel which is removably mounted to the vehicle body is attached in at least two points to the fuel tank supporting brackets or directly to the vehicle body and underlying frame. Alternatively, the lower edge of the vertical panel which is removably mounted to the vehicle body can be joined in at least two points with a lower mounting member which is in turn removably mounted to the tank supporting brackets or to the vehicle body and underlying frame.

The upper edge of the vertical panel which is removably mounted to the horizontal cover can be joined in at least two points with an upper mounting member which is removably mounted between the opposing pick-up truck bed sides, with each one of its ends mounted to one pick-up truck bed side. In such embodiments, the horizontal cover is removably mounted to the vehicle body by removably joining rear edge of the horizontal cover in at least two points with the upper mounting member and by removably joining the front edge of the horizontal cover to the front rail of the pick-up truck bed.

In this disclosure "front edge" refers to the edge closest to the front of the vehicle and "rear edge" indicates the edge closest to the rear of the vehicle.

The upper and the lower mounting members are structural elements that can be of any shape that provides the necessary strength and rigidity. For example these mounting members can be in the form of a tube, a solid bar or a channel.

An advantage of the present multi-piece fuel tank enclosure described here is that it is compatible with a range of tank sizes without substituting any of its pieces. This is because the present tank enclosure surrounds the tank without directly contacting the tank or relying upon the tank for support of the enclosure. This allows the tank enclosure to be designed to accommodate tanks which fill most of the enclosed volume as well as smaller tanks, which allows some of the enclosed volume to be used for storage of other items, for example in an integrated toolbox. The multi-piece design also allows an integrated toolbox bin to be provided when a large tank is employed by replacing the horizontal cover with a toolbox bin and lid assembly that provides the storage space by extending the overall height of the enclosure.

A second embodiment of the present enclosure provides an integrated toolbox bin. The horizontal cover comprises an assembly formed by a toolbox bin of a predetermined depth and a lid which is operable to allow access to the toolbox bin. The horizontal cover assembly and the vertical panel are each removably mounted to the vehicle body and the vertical panel is removably joined with one edge of the toolbox bin. In preferred embodiments, the predetermined depth of the toolbox bin is selected to match the size of the fuel tank and thereby increase storage volume.

Like in the first embodiment, the lower edge of the vertical panel which is mounted to the vehicle body is removably attached in at least two points to the fuel tank supporting brackets or directly to the vehicle body and underlying frame, or to a lower mounting member which is removably mounted to the fuel tank supporting brackets.

Similarly, the upper edge of the vertical panel can be removably joined in at least two points with an upper mounting member which is removably mounted between the opposing pick-up truck bed sides, with each one of its ends mounted to one bed side. In this embodiment, the horizontal cover assembly can be mounted to the vehicle body by removably joining rear edge of the toolbox bin to at least two points of the upper mounting member and by removably joining the front edge of the toolbox bin to the front rail of the pick-up truck bed. The horizontal cover assembly and the vertical panel are removably joined to each other, each one being both bolted to the upper mounting member.

In the embodiments described above, the vertical panel preferably comprises a removable section for accessing the fittings of the fuel tank. Also, the vertical panel has preferably a molded shape on at least a portion of its surface to provide improved impact resistance. For example, the profile of this molded shape can be ridged, corrugated or with other shapes that improve the rigidity and structural strength.

In some embodiments, the vertical panel can comprise a center section and two end pieces with at least one of the end pieces being removable for accessing the fuel tank fittings. In these embodiments, the center section or at least a portion of the center section has preferably a molded shape with a profile that improves its resistance to impact.

In preferred embodiments, the horizontal and the vertical panel are made of a thermally stable polymeric material, meaning one that will retain its shape and strength for the expected operating conditions.

In the embodiments where the horizontal cover comprises an assembly formed by a toolbox bin and a lid, the bin and the lid are preferably also made of a thermally stable polymeric material.

In preferred embodiments the multi-piece enclosure protects a fuel tank that is a pressure vessel for storing auxiliary fuel, for example compressed natural gas. Nonetheless, the present enclosure can be used for protecting tanks that can be used for other purposes, such as storing other gaseous fuels, liquid fuels, water and other fluids.

A method for installing the present multi-piece enclosure comprises:
  (a) removably mounting the horizontal cover to the vehicle body;
  (b) removably mounting an upper edge of the vertical panel to the horizontal cover; and
  (c) removably mounting a lower edge of the vertical panel to the vehicle body.

In this method, the step of removably mounting the horizontal cover to the pick-up truck bed comprises mounting front edge of the horizontal cover to the front rail of the truck bed rails and mounting the rear edge of the horizontal cover to an upper mounting member, which is removably mounted between the pick-up truck side rails, with each one of the ends of the upper mounting member mounted to one pick-up truck bed side. Furthermore, the step of removably mounting the upper edge of the vertical panel to the pick-up truck bed comprises removably mounting the upper edge of the vertical panel to the upper mounting member.

The step of removably mounting the lower edge of the vertical panel to the pick-up truck bed comprises removably mounting the lower edge of the vertical panel to the brackets to which the fuel tank is secured or to a lower mounting member which is removably mounted to these brackets.

Another method is provided for installing a multi-piece enclosure comprises a vertical panel and a horizontal cover formed by an assembly comprising a toolbox bin and a lid. The horizontal cover assembly and the vertical panel are removably joined to one another and protect a fuel tank secured to at least two brackets which are mounted on a pick-up truck bed. The method comprises:
  (a) removably mounting the horizontal cover to the pick-up truck bed by mounting front edge of the toolbox bin to front rail of the pick-up truck bed and mounting the rear edge of the toolbox bin to an upper mounting member, which is removably mounted between the pick-up truck bed sides with the upper mounting member having opposing ends, each mounted to one pick-up truck bed side;
  (b) removably mounting an upper edge of the vertical panel to the horizontal cover by removably mounting the upper edge of the vertical panel to the upper mounting member; and
  (c) removably mounting a lower edge of the vertical panel to the pick-up truck bed by removably mounting the lower edge of the vertical panel to the brackets to which the fuel tank is secured or to a lower mounting member which is removably mounted to these brackets.

DETAILED DESCRIPTION OF PREFERRED EMBODIMENT(S)

Figure 1:
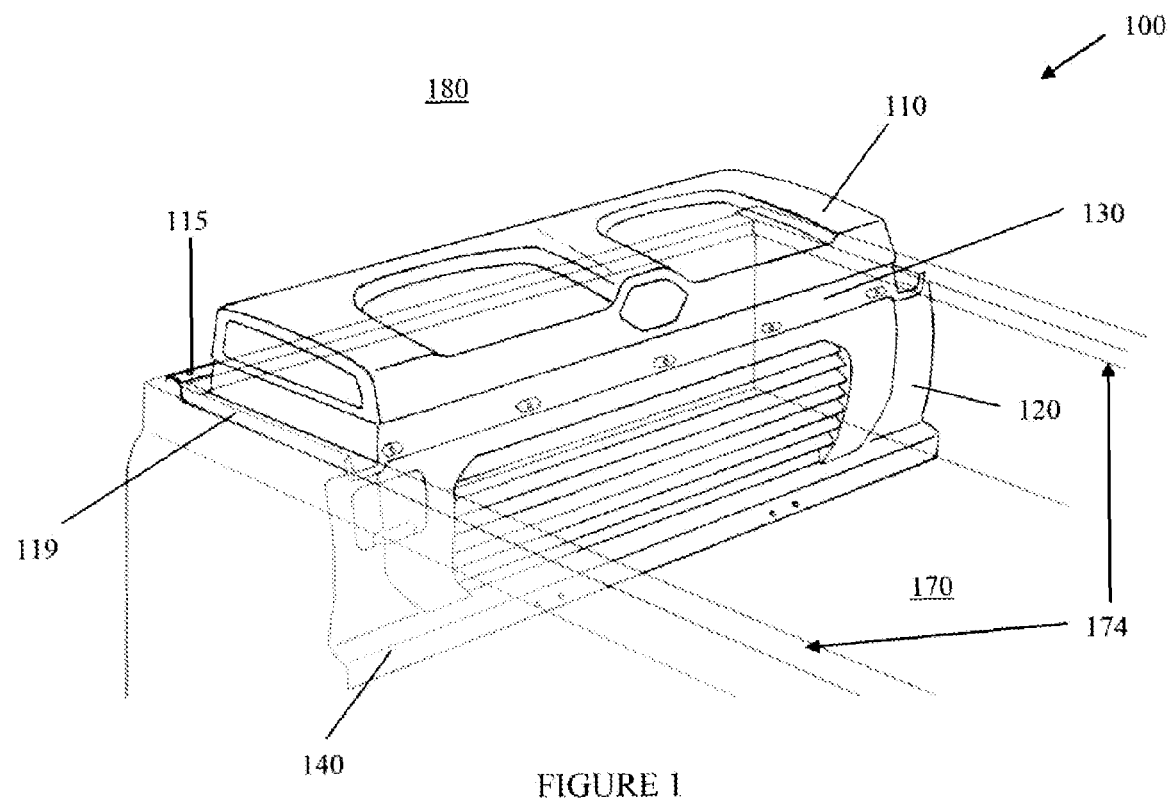
FIG. 1 is a view of the first embodiment of a multi-piece tank enclosure installed on a pick-up truck body.
Figure 2:
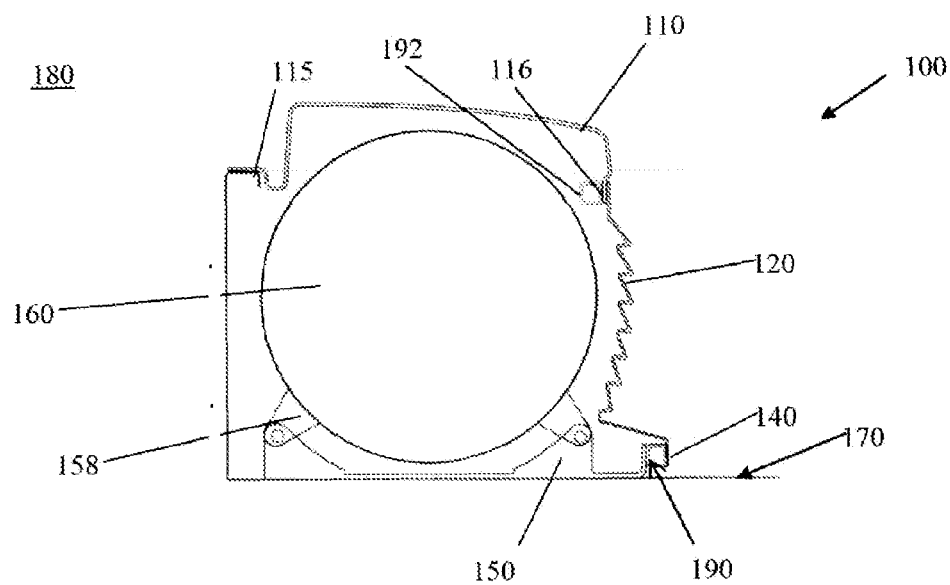
FIG. 2 is a side view of the multi-piece tank enclosure illustrated in FIG. 1.

FIGS. 1 and 2 illustrate a multi-piece tank enclosure installed on board a pick-up truck. Multi-piece enclosure 100 comprises horizontal cover 110 and vertical panel 120. When installed on a pick-up truck, horizontal cover 110 and vertical panel 120 are removably joined to one another along upper edge 130 of vertical panel 120. In the embodiment shown in FIG. 1, five bolts are employed to join the horizontal cover to the vertical panel. Lower edge 140 of vertical panel 120 and front edge 115 of horizontal cover 110 are removably attached to the vehicle body, as further explained below. In the illustrated embodiment, vertical panel 120 is removably attached to brackets 150 which secure tank 160 to the floor 170 of the truck bed and to the underlying frame.

Tank 160 can be mounted anywhere on the pick-up truck bed, but for space considerations, convenience reasons and protection purposes, in preferred embodiments, the tank is preferably placed close behind vehicle cab 180, as illustrated.

Figure 3:
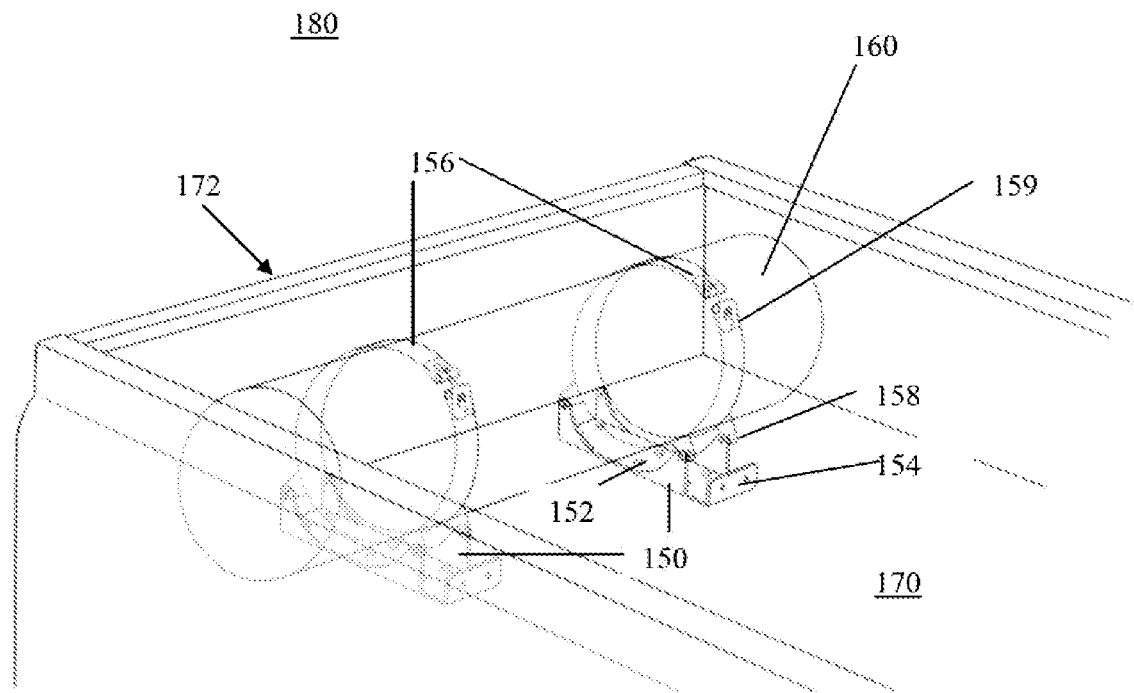
FIG. 3 is a view of a tank installed on a pick-up truck bed.
Figure 5:
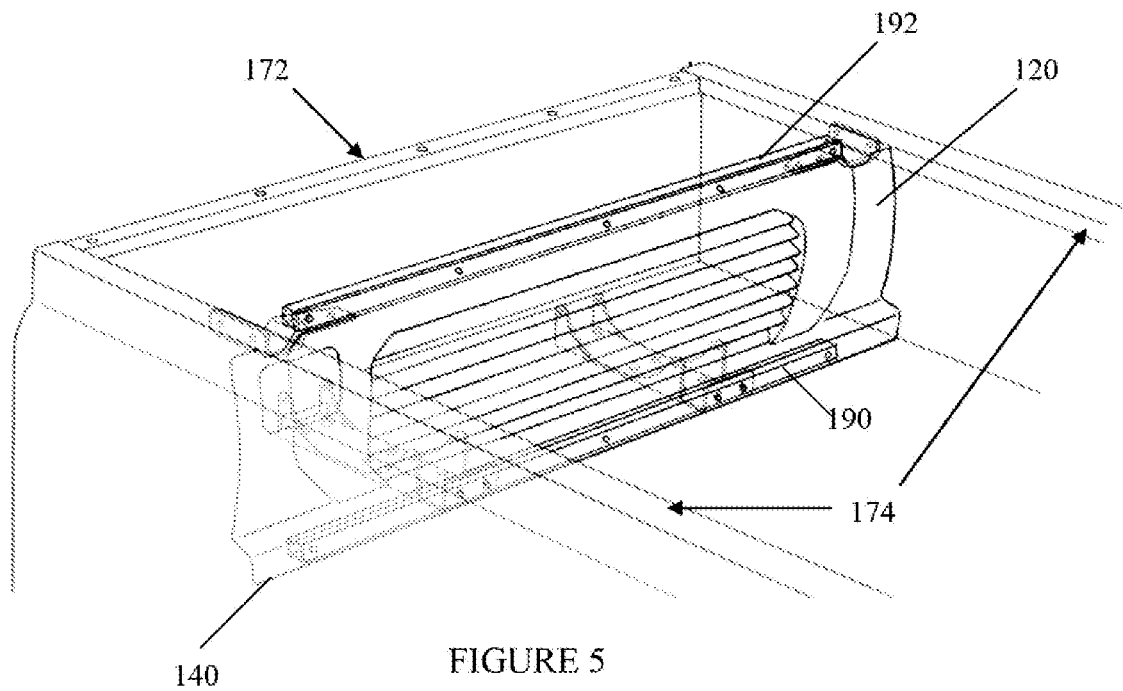
FIG. 5 is a partial view of the multi-piece enclosure attachment system showing a vertical panel installed on an upper and a lower mounting member.

As better illustrated in FIG. 3, tank 160 is securely attached to brackets 150 which are mounted on the floor 170 of the pick-up truck bed. Brackets 150 can have different shapes and preferably have a shape that provides the sturdiness required for supporting the tank. While the figures illustrate tank 160 being supported by two brackets 150, brackets could be used to secure the tank to the vehicle, if necessary. Each bracket 150 is attached to the vehicle by bolts 152 and preferably has an extension 154 to which lower mounting member 190 is mounted. Lower edge 140 of vertical panel 120 is removably attached to lower mounting member 190 as illustrated in FIGS. 2 and 5. Straps 156 which encircle auxiliary tank 160 can be mounted through a set of mounts 158 to brackets 150. Each strap 156 encircles the tank and is provided with a set of mounts 158 for attachment to one of the brackets 150 such that tank 160 is fully supported when straps 156 are tighten through tightening devices 159 to clamp onto the tank. Brackets 150 can support tanks of different dimensions. The attachment system of the tank to the truck bed is better described in co-owned U.S. non-provisional patent application entitled "Arrangement For Mounting A Tank To A Vehicle", which is being filed concurrently herewith.

In the illustrated preferred embodiments, horizontal cover 110 is mounted on the truck body over tank 160 by bolting its front edge 115 to front rail 172. The rear edge 116 of horizontal cover 110 is bolted together with upper edge 130 of vertical panel 120 to upper mounting member 192. In other embodiments, not shown, side edges 119 of horizontal cover 110 could alternatively or additionally be removably attached to the truck rails on top of each of the bed sides.

Figure 4:
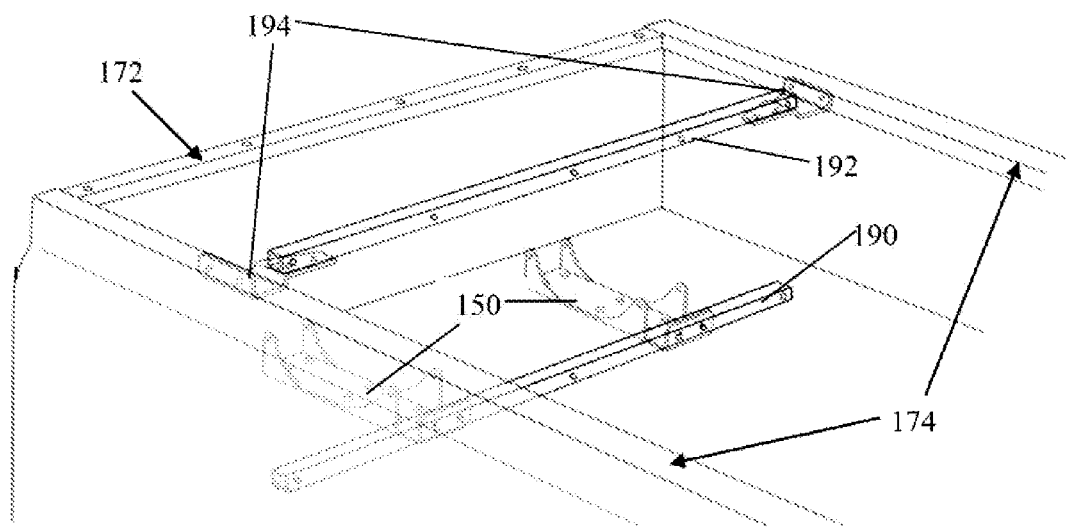
FIG. 4 is a partial view of the attachment system used for mounting the multi-piece enclosure to the pick-up truck body.

Vertical panel 120 is mounted on the truck body as illustrated in FIGS. 2, 4 and 5. Lower mounting member 190 is bolted to extensions 154 of brackets 150 and upper mounting member 192 is removably attached to bed sides 174 by being bolted to brackets 194 which are attached to the pick-up truck bed sides 174. Upper edge 130 of vertical panel 120 is bolted to upper mounting member 192 and the lower edge 140 of vertical panel 120 is bolted to lower mounting member 190. In some embodiments, lower edge 140 of vertical panel 120 can be bolted directly to brackets 150. In an alternate embodiment, when horizontal cover 110 is attached along front edge 115 and alongside edges 119 to the truck body, upper edge 130 of vertical panel 120 can be attached directly to rear edge 116 of horizontal cover 110 and the lower edge 140 of vertical panel 120 can be bolted to lower mounting member 190 or directly to brackets 150. The preferred embodiment is the embodiment which illustrates the upper and lower mounting members because they add structural strength to the enclosure and a plurality of attachment points along the edges of the horizontal cover and the vertical panel. The structural framework provided by the upper and lower mounting members is especially important when the horizontal cover and the vertical panel are made from a polymeric material. When installed on the pick-up truck body, vertical panel 120 protects one side of tank 160.

While bolting is the preferred method of joining vertical panel 120 and horizontal cover 110 to each other and attaching them to the vehicle body, other methods of removably mounting these parts can be used, for example rivets, rivet nuts, self-tapping screws or adhesives.

While in the present figures lower mounting member 190 and upper mounting member 192 are illustrated as a square channel, other structural elements of a different shape such as a solid bar or an angle can be used for the same purpose of attaching the tank enclosure to the truck body.

Horizontal cover 110 and vertical panel 120 are designed to be compatible with a range of tank sizes.

Figure 6:
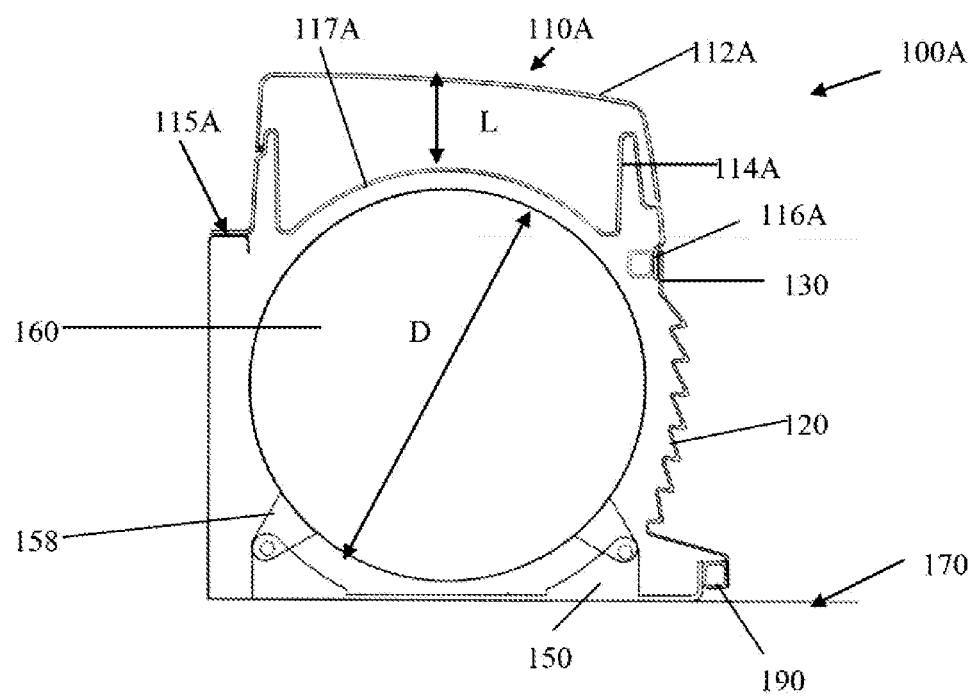
FIG. 6 is a side view of another embodiment of the multi-piece tank enclosure comprising a cover assembly consisting of a lid and a toolbox bin.

FIG. 6 shows a second embodiment of the present enclosure, in which multi-piece tank enclosure 100A comprises vertical panel 120 and horizontal cover 110A, formed by an assembly comprising tool box bin 114A and lid 112A. Tank 160 is supported on the vehicle body in the same way as illustrated in FIGS. 1-5. Mounts 158 of the straps encircling the tank are bolted to brackets 150 and thereby support tank 160 in a secure position on the floor 170 of the pick-up truck bed. Lower edge 140 of vertical panel 120 is removably attached to lower mounting member 190 which is mounted to extensions 154 of tank supporting brackets 150 or directly to brackets 150. Vertical panel 120 is attached to the vehicle body in the same way as described above in relation to the first embodiment of the present enclosure.

In the second embodiment of the multi-piece tank enclosure, horizontal cover assembly 110A comprises lid 112A and toolbox bin 114A. When multi-piece enclosure 100A is installed in the truck bed, toolbox bin 114A is placed over tank 160 and is covered by lid 112A. In preferred embodiments, bottom surface 117A of toolbox bin 114A conforms to the shape of the tank to allow more storage space for the tools while allowing enough space between the tank and the toolbox bin to avoid contact or impact damage during operation. In this second embodiment, the multi-piece tank enclosure does not only protect tank 160, but it is also used as storage space for tools and/or other objects. Front edge 115A of toolbox bin 114A is removably mounted to the vehicle body, for example to pick-up truck front rail 172 and rear edge 116A of toolbox bin 114A is removably joined with upper mounting member 192 which is bolted to brackets 194 mounted on the pick-up truck bed sides 174. Horizontal cover assembly 110A is mounted on the vehicle body over tank 160 to protect it. Upper edge 130 of vertical panel 120 is also mounted to upper mounting member 192 and thereby is removably attached to horizontal cover 110A, more specifically to toolbox bin 114A.

In an alternative embodiment, front edge 115A of toolbox bin 114A can be removably mounted to pick-up truck front rail 172, behind the cab, and side edges 119A of toolbox bin 114A are removably mounted to bed sides 174 of the pick-up truck. In such embodiments, upper edge 130 of vertical panel 120 could be removably joined directly to rear edge 116A of toolbox bin 114A.

Figure 7:
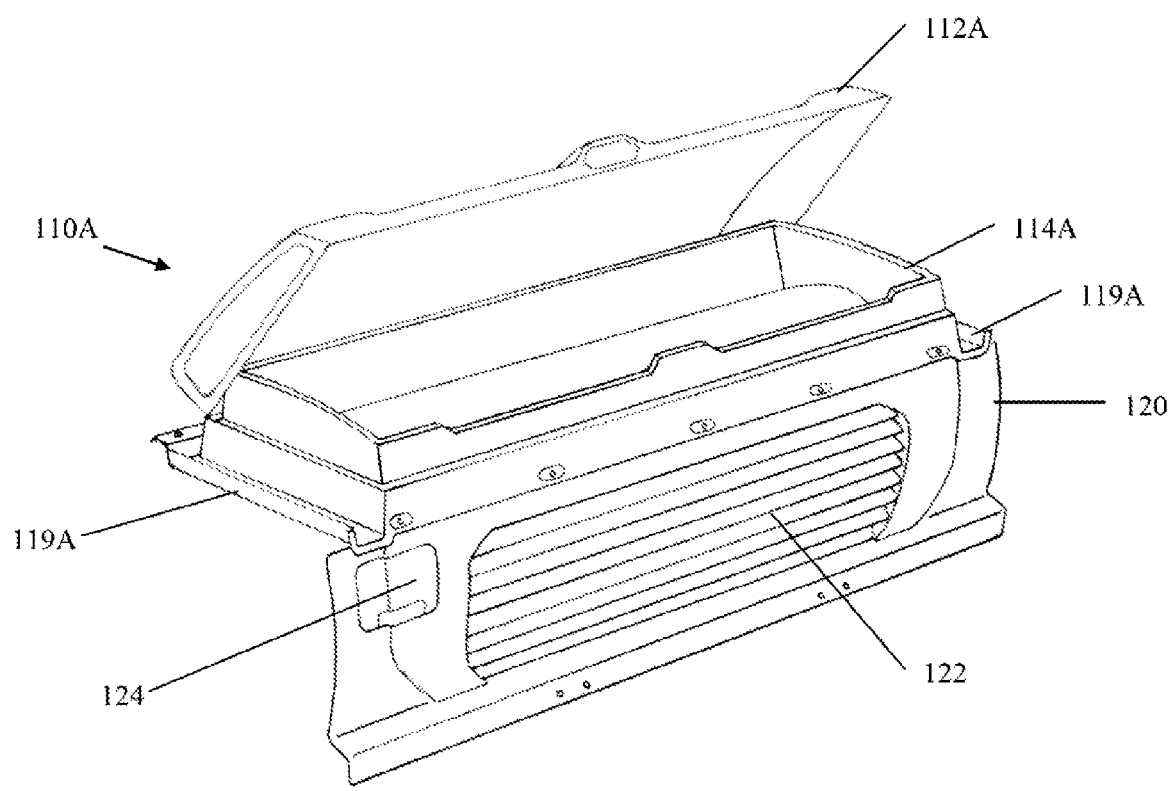
FIG. 7 is a view of an embodiment of the multi-piece tank enclosure comprising a toolbox bin and a hinged lid.

As illustrated in FIG. 7, lid 112A of the horizontal cover assembly 110A is hinged to toolbox bin 114A and can be operated to allow access to the storage space inside the toolbox bin.

Figure 8:
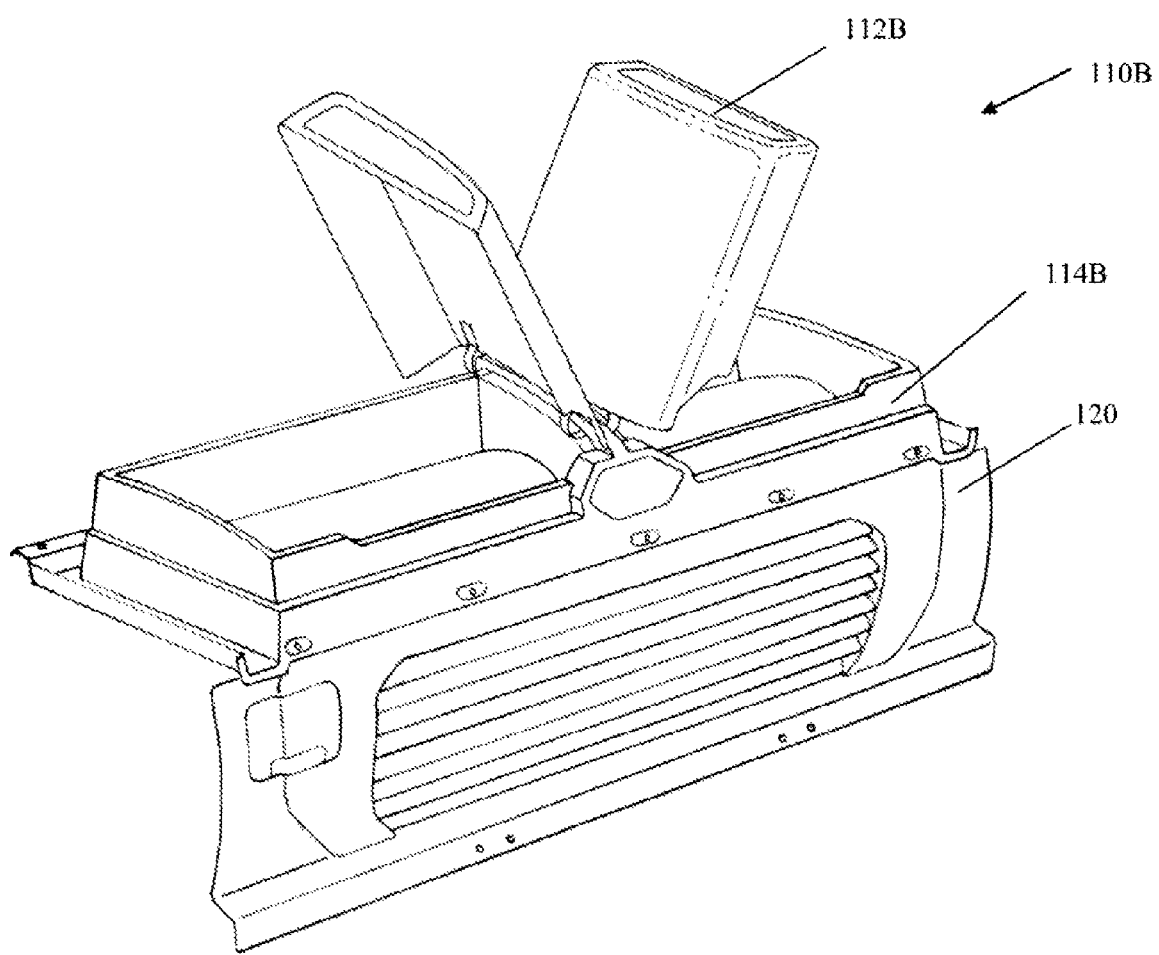
FIG. 8 is a view of another embodiment of the multi-piece tank enclosure comprising a toolbox bin and a lid made of two centrally hinged parts.

In alternative embodiment illustrated in FIG. 8, horizontal cover assembly 110B comprises toolbox bin 114B, which is removably attached to vertical panel 120, and lid assembly 112B, which comprises two parts hinged to the central portion of toolbox bin 114B. The two parts can be operated to allow access to the storage space inside the toolbox bin.

Lid 112A illustrated in FIG. 7 and the two parts of lid 112B illustrated in FIG. 8 can each be made of one piece or can be made of an inner lid that is joined together with an outer lid. The inner lid can provide a means for attaching hinges or latches by which the lid is attached to the toolbox bin and can be designed to conform to the shape of the toolbox bin to allow a better structure and impact resistance of the storage space.

The tool box bins illustrated in FIGS. 6-8 are designed to be interchangeable with other toolbox bins, each with a different predetermined depth dimension "L" so that more storage space can be provided when the enclosure is employed to protect tanks with smaller diameters D. That is a tank of a smaller cross-sectional dimension D can accommodate a toolbox bin with a greater depth L.

As described so far, horizontal cover 110 and horizontal cover assembly 100A can be attached to the vehicle body by bolting front edge 115 and respectively front edge 115A of toolbox bin 114A to the pick-up truck bed front rail 172 as illustrated in FIGS. 1 and 2 and respectively in FIG. 6. In an alternative embodiment, horizontal cover 110 or the horizontal cover assembly 110A can be provided with mounting brackets and the vertical sections of the mounting brackets can be inserted, for example, into the truck bed stake pockets to thereby mount the horizontal cover and/or the horizontal cover assembly to the pick-up truck bed.

In preferred embodiments, vertical panel 120 is formed with a shape for better resistance to impact compared to a flat panel. In the illustrated embodiments, vertical panel 120 has a series of ridges, but other shapes that provide improved impact resistance, such as a corrugated pattern or other undulating shapes, can also be employed.

Figure 9:
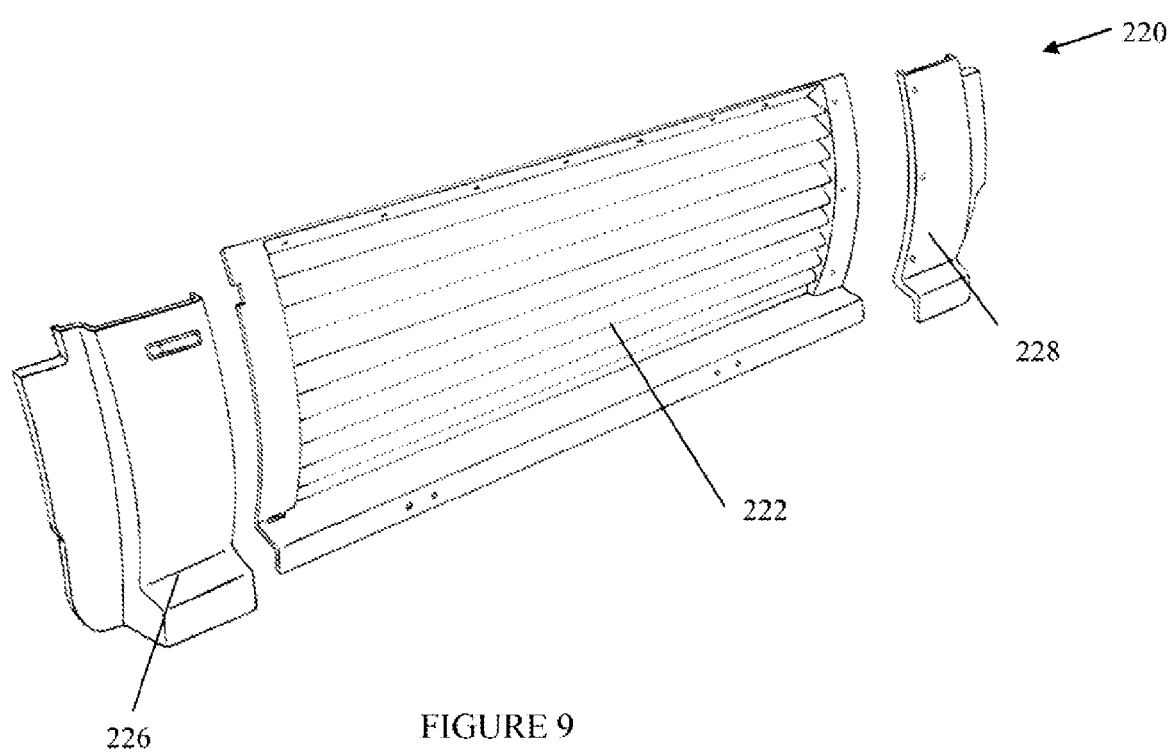
FIG. 9 is an exploded view of an embodiment of a vertical panel of the multi-piece tank enclosure comprising two detachable end caps.

Vertical panel 120 has been illustrated so far as being made of one piece provided with a central area 122, which has an undulating shape, and a door 124. Door 124 allows access to the tank fittings at any time when the tank and the multi-piece enclosure protecting the auxiliary tank are installed in the truck bed. Door 124 is closed when no access to the auxiliary tank is required. In an alternate arrangement illustrated in FIG. 9, vertical panel 220 can comprise an assembly consisting of a central section 222, a left end cap 226 and a right end cap 228. One of the end caps can be removed from the vertical panel assembly to allow access to the tank fittings when required. Since end caps 226, 228 are removably assembled with the central section 222, removal of one of the end caps can be easily done by the vehicle operator. Alternatively, an access opening (not illustrated) could be provided on one of end caps 226 or 228 for the same purpose.

All the components of the multi-piece enclosure, for example the horizontal cover and the vertical panel, are preferably made of a polymeric material that is preferably thermally stable, for example Thermo Plastic Olefin (TPO), Sheet Moulding Compound (SMC), other plastic material such as Fibre-Reinforced Plastic (FRP) or Acrylonitrile Butadiene Styrene (ABS). When the horizontal cover comprises a toolbox bin and a lid, both components can be made of polymeric material mentioned above. This is a low cost, easy to manufacture solution for an enclosure to protect a tank installed in the truck bed.

The present multi-piece enclosure allows an advantageous method for installing such an enclosure on a vehicle body. Compared to prior fully assembled solutions the separate pieces of the enclosure are easier to make, more space efficient for storing as inventory, and easier to repair by replacing individual damaged pieces. The method of assembly comprises:

(a) removably mounting lower edge 140 of vertical panel 120 to the floor 170 of the pick-up truck bed;
(b) removably mounting front edge 115 of horizontal cover 110 to the front rail 172 of the pick-up truck bed; and
(c) removably mounting upper edge 130 of vertical panel 120 to rear edge 116 of horizontal cover 110.

When separate upper and lower mounting members are employed to provide additional structure to the enclosure, these members can be installed as a first step as shown in FIG. 4 and then the horizontal cover and vertical panel assemblies can be removably mounted onto the vehicle body and the upper and lower mounting members.

The installation method is basically the same whether the enclosure includes a toolbox bin or not, but this highlights another advantage, namely that a manufacturer can offer different configurations to its customers and the same vertical panel design can be used whether the enclosure has a toolbox bin or not.

The embodiments of the present enclosure have been described as a multi-piece enclosure for protecting a tank installed on the bed of a pick-up truck. In preferred embodiments, the tank can be an auxiliary fuel tank, storing for example compressed natural gas (CNG). Vehicles fuelled with both gasoline and CNG, have to carry multiple fuel tanks, and therefore for such vehicles the present multi-piece enclosure offers the advantage of allowing more storage space for tools or other objects and, at the same time, protecting the auxiliary fuel tank.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:
1. A multi-piece enclosure defining a protected space for a tank and said tank's associated fittings installed on a vehicle comprising a vehicle body, said enclosure comprising a horizontal cover and a vertical panel, each respectively removably attached to said vehicle body, wherein said vehicle body has a bed formed therein and a front edge of said horizontal cover is removably mounted to a front rail of said bed and an upper edge of said vertical panel is removably attached to a rear edge of said horizontal cover.

2. The multi-piece enclosure of claim 1, wherein a lower edge of said vertical panel is removably attached to a structural tank support which attaches said tank to said vehicle body.

3. The multi-piece enclosure of claim 2, further comprising a lower mounting member disposed between said vertical panel and said structural tank support, wherein said lower edge of said vertical panel is removably attached to said lower mounting member and said lower mounting member is removably attached to said structural tank support.

4. The multi-piece enclosure of claim 1, further comprising an upper mounting member spanning said bed with opposite ends of said upper mounting member being respectively removably attached at opposite locations on said bed, wherein said upper edge of said vertical panel is removably attached to said horizontal cover by joinder to said upper mounting member.

5. The multi-piece enclosure of claim 4, wherein said horizontal cover is removably mounted to said vehicle body by removably joining a rear edge of said horizontal cover to said upper mounting member.

6. The multi-piece enclosure of claim 1, wherein said horizontal cover comprises an assembly formed by a toolbox bin and a lid allowing access to said toolbox bin.

7. The multi-piece enclosure of claim 6, wherein said toolbox bin is removably attached to said vehicle body and to said vertical panel.

8. The multi-piece enclosure of claim 6, wherein said toolbox bin is interchangeable with one of a plurality of toolbox bins, each one of said plurality of toolbox bins having a depth matched to the size of said tank.

9. The multi-piece enclosure of claim 6, wherein said vehicle body has a bed formed therein and said toolbox bin is removably mounted to a front rail of said bed.

10. The multi-piece enclosure of claim 6, wherein a lower edge of said vertical panel is removably attached to a structural tank support which attaches said tank to said vehicle body.

11. The multi-piece enclosure of claim 10, further comprising a lower mounting member disposed between said vertical panel and said structural tank support, wherein said lower edge of said vertical panel is removably attached to said lower mounting member and said lower mounting member is removably attached to said structural tank support.

12. The multi-piece enclosure of claim 9, further comprising an upper mounting member spanning said bed with opposite ends of said upper mounting member being respectively removably attached at opposite locations on said bed, wherein an upper edge of said vertical panel is removably attached to said toolbox bin by joinder to said upper mounting member.

13. The multi-piece enclosure of claim 12, wherein said horizontal cover assembly is removably mounted to said vehicle body by removably joining a rear edge of said toolbox bin with said upper mounting member.

14. The multi-piece enclosure of claim 1, wherein said vertical panel comprises a removable section for accessing said fittings associated with said tank.

15. The multi-piece enclosure of claim 1, wherein said vertical panel has a shape contoured to promote impact resistance on at least a portion of said vertical panel surface.

16. The multi-piece enclosure of claim 15, wherein said shape comprises at least one of ridges and corrugations.

17. The multi-piece enclosure of claim 1, wherein said vertical panel comprises a central section and two end caps, and at least one of said end caps is removable for accessing said fittings.

18. The multi-piece enclosure of claim 1, wherein said horizontal and said vertical panel are formed of thermally stable polymeric material.

19. The multi-piece enclosure of claim 6, wherein said lid and said toolbox bin are formed of thermally stable polymeric material.

20. The multi-piece enclosure of claim 1, wherein said tank is a pressure vessel for storing a fuel.

21. A method of installing a multi-piece enclosure comprising a horizontal cover and a vertical panel removably joined to one another to protect a tank mounted on a vehicle bed, the method comprising:
   (a) removably mounting said horizontal cover to a vehicle body;
   (b) removably mounting an upper edge of said vertical panel to a rear edge of said horizontal cover; and
   (c) removably mounting a lower edge of said vertical panel to said vehicle body.

22. The method of claim 21, wherein said step of removably mounting said horizontal cover to said vehicle body comprises mounting a front edge of said horizontal cover to a front rail of said vehicle bed and mounting a rear edge of said horizontal cover to an upper mounting member removably mounted between said vehicle bed sides, each end of said upper mounting member mounted to one side of said vehicle bed, and wherein said step of removably mounting said upper edge of said vertical panel to said horizontal cover comprises removably mounting said upper edge of said vertical panel to said upper mounting member.

23. The method of claim 22, wherein said step of removably mounting said lower edge of said vertical panel to said vehicle body comprises removably mounting said lower edge of said vertical panel to a lower mounting member removably attached to a support structure for said tank.

24. A method of installing a multi-piece enclosure for protecting a tank mounted in a vehicle bed comprising a vertical panel and a horizontal cover that comprises a toolbox bin and a lid, wherein said vertical panel and said horizontal cover are removably joined to one another, the method comprising:
   (a) removably mounting a front edge of said toolbox bin to a front rail of said vehicle bed and mounting a rear edge of said toolbox bin to an upper mounting member removably mounted on opposite sides of said vehicle;
   (b) removably mounting an upper edge of said vertical panel to said upper mounting member; and
   (c) removably mounting a lower edge of said vertical panel to said vehicle bed.

* * * * *